(12) United States Patent  
Dayal et al.

(10) Patent No.: US 11,568,566 B2
(45) Date of Patent: Jan. 31, 2023

(54) ALIGNING VISION-ASSIST DEVICE CAMERAS BASED ON PHYSICAL CHARACTERISTICS OF A USER

(71) Applicant: Toyota Motor Engineering & Manufacturing North America, Inc., Erlanger, KY (US)

(72) Inventors: Rajiv Dayal, Milpitas, CA (US); Tiffany Chen, San Jose, CA (US); Allison V. L. Thackston, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 1199 days.

(21) Appl. No.: 15/205,946

(22) Filed: Jul. 8, 2016

(65) Prior Publication Data

US 2018/0012376 A1    Jan. 11, 2018

(51) Int. Cl.
  *G06T 7/80* (2017.01)
  *A61H 3/06* (2006.01)
  *G06T 7/73* (2017.01)
  *H04N 5/232* (2006.01)

(52) U.S. Cl.
  CPC .............. *G06T 7/80* (2017.01); *A61H 3/061* (2013.01); *G06T 7/73* (2017.01); *H04N 5/232* (2013.01); *A61H 2003/063* (2013.01); *A61H 2201/165* (2013.01); *A61H 2201/1609* (2013.01); *A61H 2201/1614* (2013.01); *A61H 2201/5048* (2013.01); *A61H 2201/5058* (2013.01); *A61H 2201/5082* (2013.01); *A61H 2201/5092* (2013.01); *G06T 2207/30244* (2013.01)

(58) Field of Classification Search
  CPC .......... G06F 3/017; G06F 3/011; G06F 3/013; G06F 1/163; G06F 3/0346; G06F 3/014; G06F 3/16; G02B 27/017; G02B 2027/0138; G02B 2027/0187; G02B 27/0093; G06T 19/006; A63F 13/213; G06K 9/00335; G06K 9/00288
  See application file for complete search history.

(56) References Cited

U.S. PATENT DOCUMENTS

| | | | |
|---|---|---|---|
| 7,482,937 B2 | 1/2009 | Chai et al. | |
| 8,159,363 B2 | 4/2012 | Song | |
| 8,588,464 B2 | 11/2013 | Albertson et al. | |
| 8,641,301 B2 | 2/2014 | Yang et al. | |
| 9,189,973 B2 | 11/2015 | Wexler et al. | |
| 2006/0209013 A1 | 9/2006 | Fengels | |
| 2013/0338525 A1* | 12/2013 | Allen | A61B 5/1135 600/534 |
| 2016/0065858 A1* | 3/2016 | Kimber | H04N 5/23296 |
| 2016/0360146 A1* | 12/2016 | Smith | H04N 5/772 |

* cited by examiner

*Primary Examiner* — Farhan Mahmud
(74) *Attorney, Agent, or Firm* — Dinsmore & Shohl LLP

(57) ABSTRACT

A vision-assist device may include at least one image sensor for generating image data corresponding to an environment, a user input device for receiving user input regarding one or more physical characteristics of a user, and a processor. The processor may be programmed to receive the image data from the at least one image sensor, receive the user input from the user input device, and adjust an alignment of the at least one image sensor based on the received image data and the user input. Methods for aligning an image sensor are also provided.

11 Claims, 7 Drawing Sheets

ALIGNING VISION-ASSIST DEVICE CAMERAS BASED ON PHYSICAL CHARACTERISTICS OF A USER

TECHNICAL FIELD

The present specification generally relates to vision assist devices and, more specifically, vision assist devices capable of automatically adjusting camera alignment based on physical characteristics of a user.

BACKGROUND

Blind or visually impaired persons may utilize a computer-based aid device to provide information, such as navigation instructions or information regarding the user's environment. Such aid devices may include one or more image sensors to provide image data to the aid device. However, the orientation of the image sensors may be affected by the physical characteristics of the user. For example, the image sensors may capture different image data when the aid device is worn by a short, thin user as compared to when the aid device is worn by a tall, heavy user. The image sensors may miss objects or may not be able to accurately detect objects using object recognition algorithms. Therefore, the alignment of the image sensor may need to be altered depending on the physical characteristics of the user.

Accordingly, a need exists for methods and apparatuses to adjust alignment of an image sensor based on the physical characteristics of a user.

SUMMARY

In one embodiment, a vision-assist device may include at least one image sensor for generating image data corresponding to an environment, a user input device for receiving user input regarding one or more physical characteristics of a user, and a processor. The processor may be programmed to receive the image data from the at least one image sensor, receive the user input from the user input device, and adjust an alignment of the at least one image sensor based on the received image data and the user input.

In another embodiment, a method for aligning an image sensor may include receiving, from an image sensor, image data corresponding to an environment, receiving, from a user input device, user input regarding one or more physical characteristics of a user, and adjusting an alignment of the image sensor based at least in part on the one or more physical characteristics of the user.

In yet another embodiment, a vision-assist device may include at least one image sensor for generating image data corresponding to an environment, a motor coupled to the at least one image sensor, a user input device for receiving user input regarding one or more physical characteristics of a user, and a processor. The processor may be programmed to receive the image data from the at least one image sensor, receive the user input from the user input device, and provide a signal to the motor regarding a desired alignment for the at least one image sensor based on the received image data and the user input.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are directed to vision-assist devices for helping blind or visually-impaired individuals navigate their environment. Generally, embodiments described herein may be configured as devices that capture data regarding a user's physical characteristics and adjust an alignment of a camera of the device. The physical characteristics can be, for example, a height, weight, or width of the user. Because the physical characteristics of a user may impact the alignment of a camera, the embodiments described herein automatically adjust alignment of the camera based on the received physical characteristics.

Figure 1:
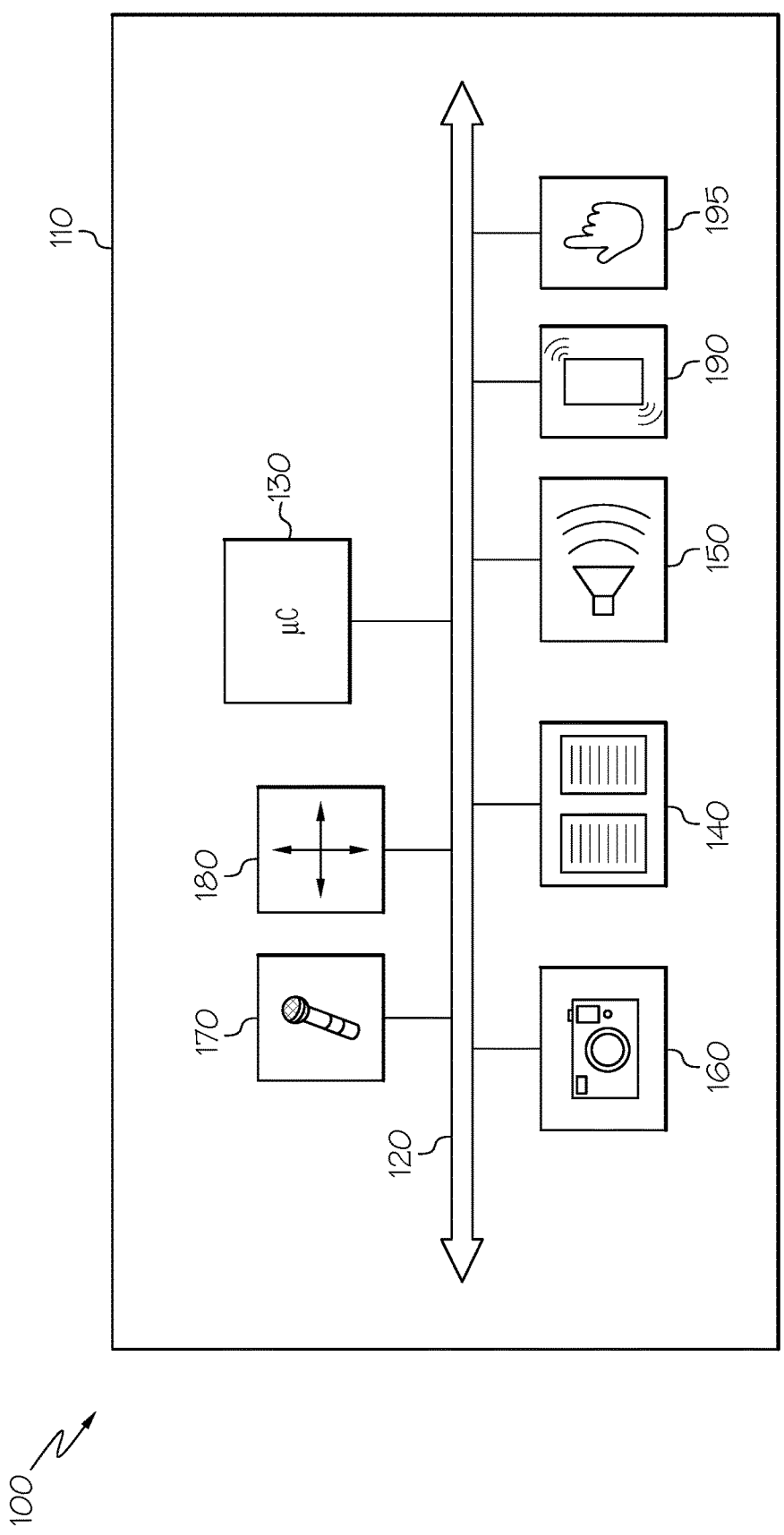
FIG. 1 schematically depicts a vision-assist device according to one or more embodiments shown and described herein.

Referring now to FIG. 1, one embodiment of a vision-assist device 100 is schematically depicted. The vision-assist device 100 includes a housing 110, one or more processors 130, one or more memory components 140 storing computer-readable instructions, one or more audio devices 150, a tactile feedback device 190, and one or more user input devices 195. The components of the vision-assist device 100 other than the housing 110 may be contained within or mounted to the housing 110. The various components of the apparatus and the interaction thereof will be described in detail below.

The memory component 140 may be configured as a volatile and/or nonvolatile non-transitory computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the memory component 140 may be configured to store, among other things, operation logic, object recognition logic, object correlation logic, and auditory message generation logic, as described in more detail below. The memory component 140 may also store data, such as data captured by one or more sensors or externally acquired data, for performing image sensor alignment described hereinbelow.

A local interface 120 is also included in FIG. 1 and may be implemented as a bus or other interface to facilitate communication among components of the vision-assist device 100. Although not depicted in FIG. 1, the vision-assist device 100 may also include one or more network interface modules, to connect the vision-assist device 100 to a remote computing device or a remote computer network. The network interface module may include any wired or wireless networking hardware, such as a modem, LAN port, wireless fidelity (Wi-Fi) card, WiMax card, mobile communications hardware, and/or other hardware for communicating with other networks and/or devices.

The one or more processors 130 may include any processing component configured to receive information and execute instructions, such as from the memory component 140. Accordingly, the one or more processors 130 may be a controller, an integrated circuit, a microchip, a computer, or any other computing device. The one or more processors 130 are communicatively coupled to the other components of the vision-assist device 100 by the local interface 120. Accordingly, the local interface 120 may communicatively couple any number of processors with one another, and allow the components coupled to the local interface 120 to operate in a distributed computing environment. Specifically, each of the components may operate as a node that may send and/or receive data.

The vision-assist device 100 further includes one or more sensors. The sensors can include, for example, one or more image sensors 160, a location sensor, an accelerometer, a gyroscope, a microphone 170, an inertial measurement unit 180, or the like. The accelerometer and the gyroscope may be part of the inertial measurement unit 180, as described hereinbelow, or may be standalone sensors, depending on the particular embodiment.

The one or more image sensors 160 are configured to capture image data of the environment in which the vision-assist device 100 operates. The image data digitally represents the environment in which the vision-assist device 100 operates, such as object and people within the environment. The image sensor 160 may be configured as any sensor operable to capture image data, such as a camera, a charge-coupled device image sensor or complementary metal-oxide-semiconductor sensor capable of detecting optical radiation having wavelengths in the visual spectrum. The image sensor 160 may be configured to detect optical radiation wavelengths outside of the visual spectrum, such as wavelengths within the infrared spectrum. In some embodiments, multiple image sensors 160 are provide to create stereo image data capable of providing depth information. When the image sensor 160 is configured as a camera, the camera may have any resolution, and may be an omni-directional camera or a panoramic camera. In some embodiments, one or more optical components, such as a mirror, fish-eye lens, or any other type of lens may be optically coupled to the camera. In some embodiments, a first camera and a second camera may be utilized to produce a stereoscopic image for providing depth information. Various embodiments include one or more imaging sensors. In embodiments, the image sensor 160 is coupled to a motor and controller (not shown) configured to adjust an alignment of the image sensor 160, as will be described in greater detail hereinbelow. The controller may be a dedicated controller, or may be the processor 130. In other embodiments, the image sensor 160 may be coupled to a gimbal (not shown) that may stabilize the vertical orientation of the image sensor 160 and/or enable adjustment of the alignment of the image sensor 160.

The inertial measurement unit 180 is coupled to the local interface 120 and communicatively coupled to the one or more processors 130. The inertial measurement unit 180 may include one or more accelerometers and one or more gyroscopes. The inertial measurement unit 180 transforms sensed physical movement of the vision-assist device 100 into a signal indicative of an orientation, a rotation, a velocity, or an acceleration of the vision-assist device 100. As an example and not a limitation, the image sensor alignment can take into account inertial measurement information to determine an orientation or rotation of the vision-assist device 100 and to determine an appropriate alignment for the image sensor 160. More particularly, in some embodiments, the vision-assist device 100 may obtain the direction of gravity form the accelerometer to determine an angle of rotation for the image sensor 160. Some embodiments of the vision-assist device 100 may not include the inertial measurement unit 180, such as embodiments that include an accelerometer but not a gyroscope, embodiments that include a gyroscope but not an accelerometer, or embodiments that include neither an accelerometer nor a gyroscope.

Still referring to FIG. 1, the microphone 170 is coupled to the local interface 120 and communicatively coupled to the one or more processors 130. The microphone 170 may be any device capable of transforming a mechanical vibration associated with sound into an electrical signal indicative of the sound. The microphone 170 may be used as a user input device 195 to perform tasks, such as navigate menus, input settings and parameters, respond to prompts and questions regarding physical characteristics of the user, and any other tasks. It should be understood that some embodiments may not include the microphone 170.

The one or more audio devices 150 may be configured as speakers capable of receiving auditory signals from the one or more processors 130 (either directly or indirectly from other hardware, such as amplifiers, drivers, digital-to-analog converters, and the like) to produce auditory messages capable of being heard by the user. In some embodiments, the one or more audio devices 150 include a first speaker and a second speaker so that the auditory message is provided to the user in stereo.

The tactile feedback device 190 is coupled to the local interface 120 and communicatively coupled to the one or more processors 130. The tactile feedback device 190 may be any device capable of providing tactile feedback to a user. The tactile feedback device 190 may include a vibration device (such as in embodiments in which tactile feedback is delivered through vibration), an air blowing device (such as in embodiments in which the tactile feedback is delivered through a puff of air), or a pressure generating device (such as in embodiments in which the tactile feedback is delivered through generated pressure). It should be understood that some embodiments may not include the tactile feedback device 190.

The one or more user input devices 195 are provided for the user to communicate with the vision-assist device 100. The one or more user input devices 195 may be any device capable of transforming user contact into a data signal that can be transmitted over the local interface 120 such as, for example, a keyboard, buttons, switches, knobs, touch-sensitive pads, microphones, and the like. In some embodiments, the one or more user input devices 195 may include a power button, a volume button, an activation button, a scroll button, or the like. The one or more user input devices 195 may be used by the user to complete tasks such as program preferences or settings, provide commands, provide feedback to the vision-assist device 100, navigate menus, make selections, provide information regarding physical characteristics of the user, and any other functionality described herein. Any appropriate user input device may be utilized and may be disposed on any surface of the housing 110. It should be understood that some embodiments may not include the user input devices 195.

It should be understood that the vision-assist device 100 may include additional components not illustrated in FIG. 1, such as a power source, voltage regulators, analog-to-digital converters, digital-to-analog converters, drivers, signal conditioning circuits, electromagnetic filtering circuits, lights, proximity sensors, temperature sensors, and the like.

Figure 2:
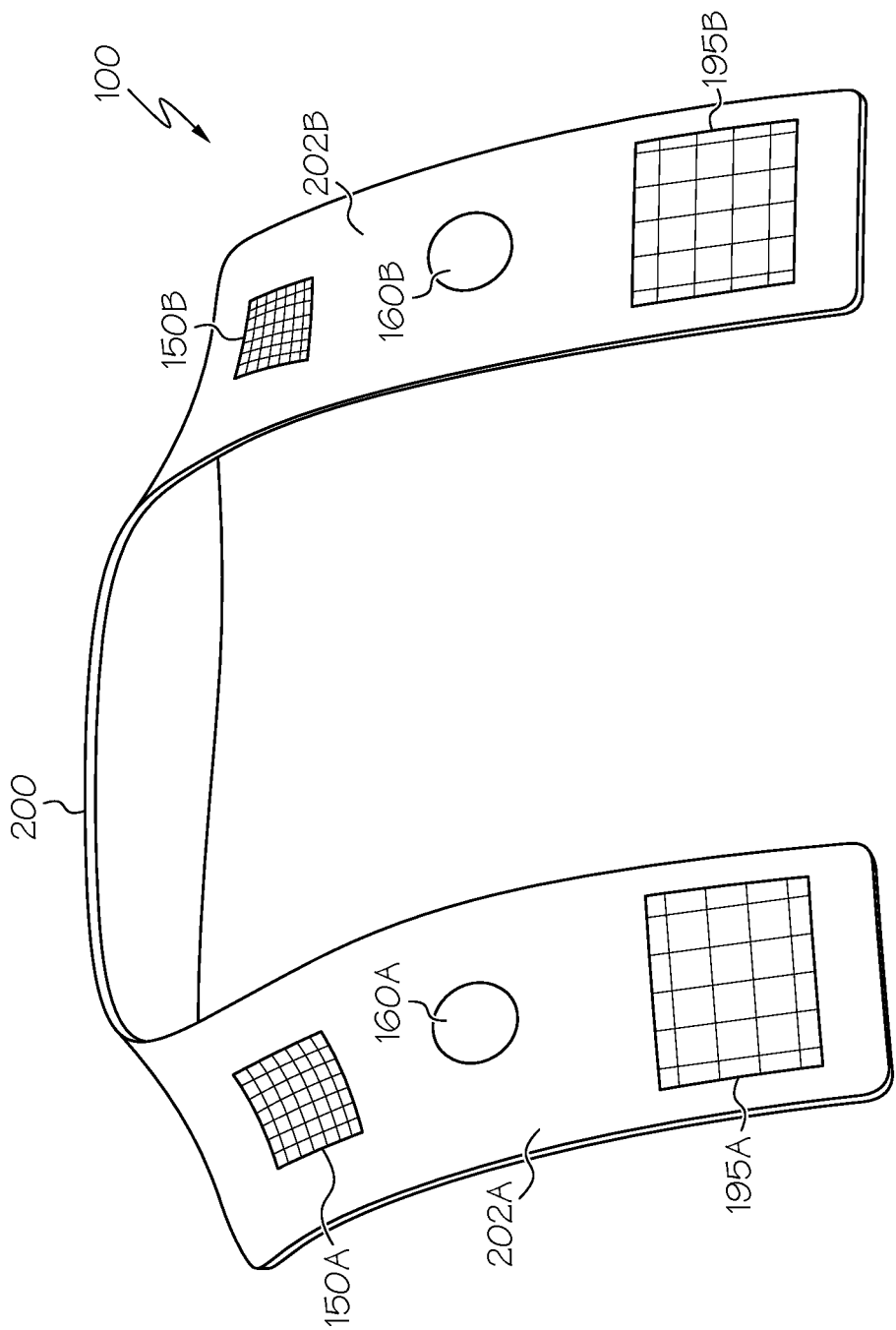
FIG. 2 schematically depicts a vision-assist device configured to be worn around the neck of a user according to one or more embodiments shown and described herein.
Figure 3:
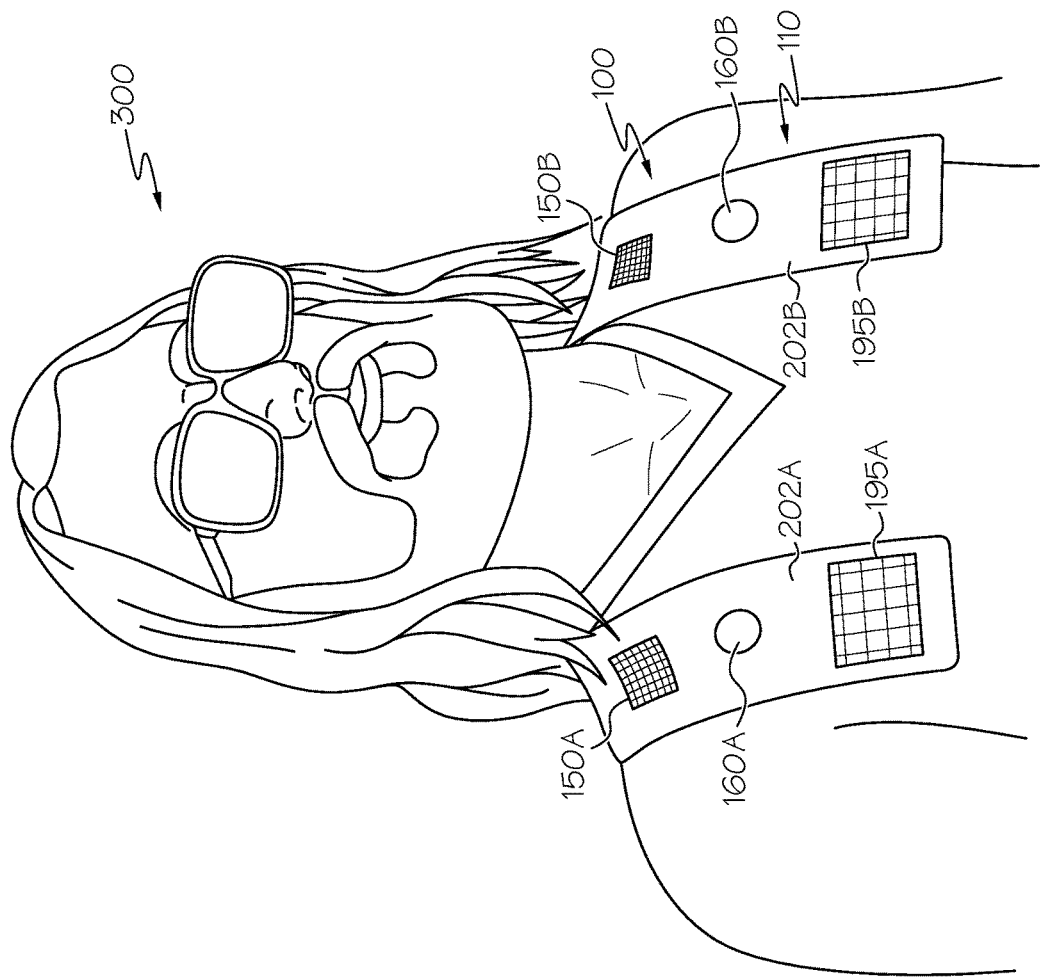
FIG. 3 schematically depicts the vision-assist device of FIG. 2 as worn by a user according to one or more embodiments shown and described herein.

Referring now to FIGS. 2 and 3, a non-limiting example vision-assist device 100 is schematically depicted. FIG. 2 illustrates the example vision-assist device 100 without a user, while FIG. 3 illustrates the example vision-assist device 100 of FIG. 2 worn by a user 300. Referring generally to both FIGS. 2 and 3, the example vision-assist device 100 has a necklace configuration intended to be worn around the neck of the user 300. The housing 110 of the vision-assist device 100 defines a neck portion 200, a first chest portion 202A, and a second chest portion 202B. It should be understood that the housing 110 may take on different shapes and sized in other embodiments.

In some embodiments, the housing 110 is made from a pliable material, such as, without limitation, ethylene-vinyl acetate. In other embodiments, the housing 110 is made from a rigid material.

Referring specifically to FIG. 3, the vision-assist device 100 is configured to be worn around the neck of the user 300 such that the neck portion 200 contacts, or is in close proximity to, the back of the user's neck. The first and second chest portions 202A, 202B are draped over the user's chest. In the illustrated example of FIGS. 2 and 3, the first chest portion 202A includes a first audio device 150A, a first image sensor 160A, and a first user input device 195A configured as a touch-sensitive pad or a plurality of buttons. Similiarly, the second chest portion 202B includes a second audio device 150B, a second image sensor 160B, and a second user input device 195B. It should be understood that the arrangement of the various components within the housing 110 of the vision-assist device 100 are for illustrative purposes only, and that more or fewer components may be provided, or arranged in a manner that is different from the arrangement depicted in FIGS. 2 and 3. As a non-limiting, alternative arrangement, only one of the first or second chest portions 202A, 202B may include a user input device.

The first and second image sensors 160A, 160B are configured to capture image data to produce three-dimensional images of the scene as the user navigates the environment that are used by an object recognition algorithm(s) to detect objects and people. As shown in FIG. 3, the first and second image sensors 160A, 160B are disposed within the first and second chest portions 202A, 202B such that they are forward-facing and capture image data of the environment directly in front of the user. As will be described in greater detail hereinbelow, the alignment of each of the first and second image sensors 160A, 160B is adjustable based on one or more physical characteristics of the user 300 to ensure that image data is being captured from a desired direction. In some embodiments, one or more additional image sensors may be disposed within the housing 110 to provide image data in directions other than in front of the user 300, such as to the right, left, and/or rear of the user 300.

The first and second audio devices 150A, 150B produce auditory messages that are intended to be received by the user 300. The auditory messages may provide menu navigation options to the user so that the user may program or otherwise set parameters of the vision-assist device 100. Auditory message may also include questions about physical characteristics of the user or instructions for adjusting one or more of the image sensors, as described in detail below. Although two audio devices are shown, more or fewer audio devices may be provided. In some embodiments, a microphone is also provided as a user-input device to enable voice control of the vision-assist device 100. In this manner, the user 300 may provide feedback to the vision-assist device 100 using voice commands. As an example and not a limitation, first and/or second audio device 150A, 150B may be configured as a combination speaker/microphone device capable of both receiving voice commands and emitting auditory messages/sounds.

Although the vision-assist device 100 has been described as being implemented as a necklace, it should be understood that the vision-assist device 100 may be implemented in any suitable form. For example, the vision-assist device may take the form of eyeglasses, a wristband or watch, a phone, a brooch, a robot, or the like.

Figure 4:
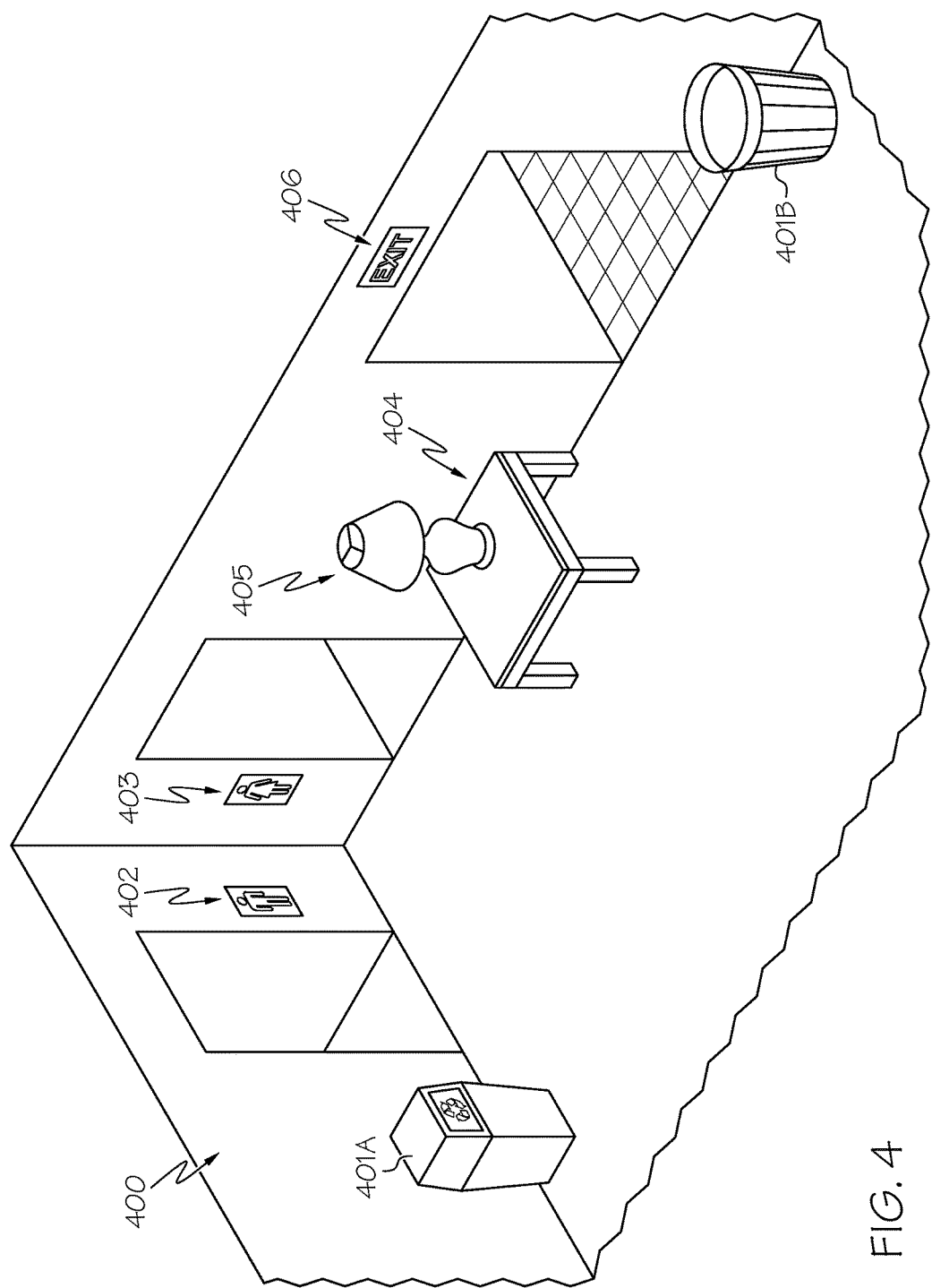
FIG. 4 schematically depicts an environment in which a user may navigate according to one or more embodiments shown and described herein.

Operation of a vision-assist device 100 will now be described. FIG. 4 depicts a scene or environment 400 in which the user may navigate. For example, the environment 400 may be a retail store. Several objects and features are present within the illustrated environment 400, such as a first trash can 401A, a second trash can 401B, a men's restroom as indicated by a men's restroom sign 402, a women's restroom as indicated by a women's restroom sign 403, a table 404, a lamp 405, and an exit as indicated by an exit sign 406. As the user navigates the environment 400, the vision-assist device 100 captures data from the sensors and provides information to the user 300 about the environment.

Figure 5:
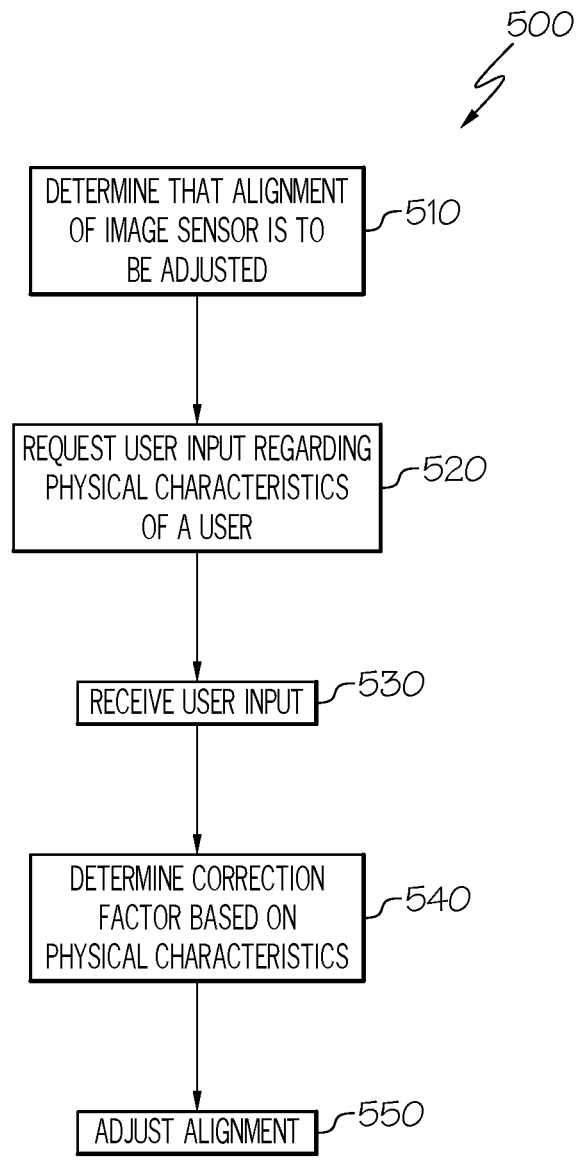
FIG. 5 graphically depicts a flowchart of aligning an image sensor based on physical characteristics of a user according to one or more embodiments shown and described herein.

FIG. 5 illustrates a process 500 of aligning an image sensor based on physical characteristics of a user. The vision-assist device 100 determines that alignment of one or more of the image sensors 160A, 160B is to be adjusted at block 510. For example, the vision-assist device 100 may determine that alignment of one or more of the image sensors 160A, 160B is to be adjusted when the vision-assist device 100 is initially powered up, responsive to receiving a user request to calibrate the vision-assist device 100, responsive to determining that received image data does not include expected image data, or the like.

Figure 6:
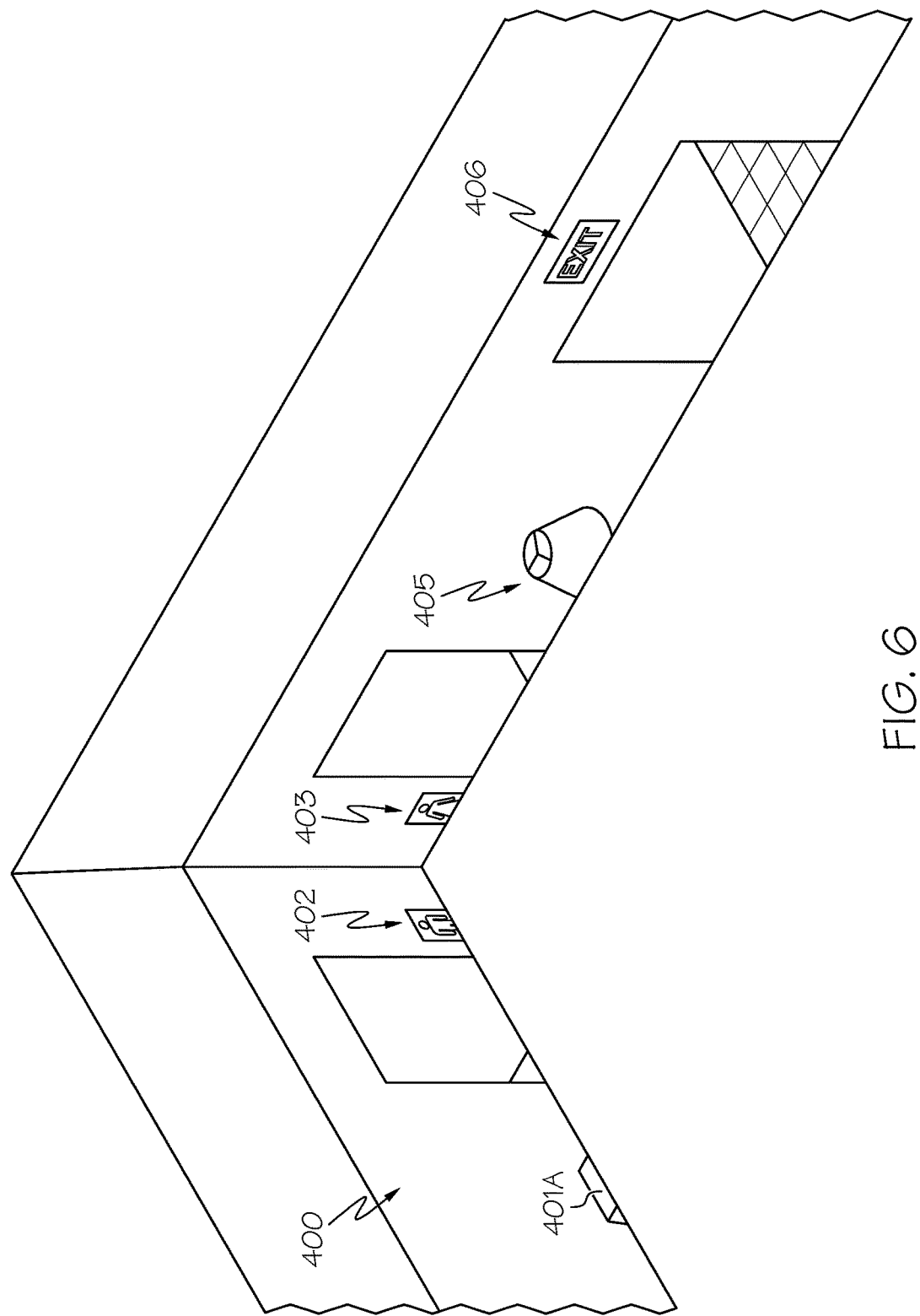
FIG. 6 schematically depicts image data of the environment in FIG. 4 received from an image sensor prior to alignment adjustment.

In various embodiments, the vision-assist device 100 determines that alignment of one or more of the image sensors 160A, 160B is to be adjusted based at least in part upon image data received from the image sensor. For example, the vision-assist device 100 may receive from the image sensor 160A image data that corresponds to the environment shown in FIG. 6. As shown in FIG. 6, the image data captures an upper portion of the environment depicted in FIG. 4. However, because of the alignment of the image sensor 160A, image data for the bottom portion of the environment, including a large portion of the first trash can 401A, the second trash can 401B, the bottom half of the men's restroom sign 402, the bottom half of the women's restroom sign 403, and the table 404, is not captured. The vision-assist device 100 may determine, for example, that because expected objects, such as the floor or a bottom half of one or more signs, are not present in the image data, the alignment of the image sensor 160A is to be adjusted.

In embodiments, the vision-assist device 100 may determine that alignment of one or more of the image sensors 160A, 160B is to be adjusted based on one or more objects in view of the image sensors 160A, 160B over a range of distances. For example, the vision-assist device 100 may determine that a particular object in the environment 400 should be within view of the image sensors 160A, 160B over a predetermined range of distances. As the user 300 moves through the environment 400, if the object is not within the view of the image sensors 160A, 160B over the predetermined range of distances, the vision-assist device 100 may determine that alignment of the one or more image sensors 160A, 160B is to be adjusted.

At block 520, the vision-assist device 100 requests user input regarding one or more physical characteristics of a user. For example, the processor 130 may execute instructions to cause the vision-assist device 100 to ask the user one or more questions about the user's physical characteristics. The questions may be provided to the user, for example, through the audio device 150, or through a display. It should be understood that the questions may be provided to the user in other ways, depending on the particular embodiment.

In various embodiments, the vision-assist device 100 requests input regarding one or more physical characteristics that a user can easily obtain. For example, the vision-assist device 100 may request input regarding physical characteristics such as a height of the user, a weight of the user, a neck size of the user, and a chest size of the user. It should be understood that user input regarding other physical characteristics may be requested, depending on the particular embodiment.

At block 530, the vision-assist device 100 receives the user input. For example, the user may provide answers in response to the requests at block 520. The user may provide the answers via the microphone 170, or through another user input device 195. It should be understood that the user may provide answers in other ways, depending on the particular embodiment and the particular vision-assist device employed.

Responsive to receiving the user input, the vision-assist device 100 determines a correction factor based on the physical characteristics of the user at block 540. The correction factor may be based on the specific physical characteristics of the user, or may be based on a profile assigned to the user based on the physical characteristics, as will be explained in greater detail below. The correction factor may be an amount the image sensor is to be adjusted in one or more directions. In embodiments, the vision-assist device 100 may provide an absolute alignment value for the image sensor 160 instead of a correction factor. The absolute alignment value may be, for example, an angle between the image sensor 160 and the environment. Because the angle between the image sensor 160 and the environment depends on both the angle between the image sensor 160 and the user and the angle between the user and the environment, the correction factor may be utilized to adjust the angle between the image sensor 160 and the user.

Next, at block 550, the vision-assist device 100 adjusts the alignment of the image sensor 160. For example, the alignment of the image sensor 160 may be adjusted with respect to the environment by applying the correction factor determined in block 540. In particular, the horizontal alignment of a field of view of the image sensor 160, the vertical alignment of a field of view of the image sensor 160, or a combination of horizontal and vertical alignments of the field of view of the image sensor 160 may be adjusted by applying the correction factor. Adjustment of the image sensor 160 may be performed, for example, by automatically adjusting the image sensor 160, as will be described in greater detail below, or by providing instructions to the user to realign the image sensor 160.

In an example embodiment, the user 300 places the vision-assist device 100 around his neck and turns the vision-assist device 100 on. When the vision-assist device 100 receives image data from the image sensor 160, it performs object recognition algorithms and determines that the image data received from the image sensor 160 is primarily image data pertaining to the ceiling of the environment, as depicted in FIG. 6, indicating that the image sensor 160 is aligned in an upward direction. Based on this determination, the vision-assist device 100 determines that the alignment of the image sensor 160 should be adjusted. Accordingly, the vision-assist device 100 asks the user 300, through the audio device 150, for the weight of the user 300. The user 300 speaks his weight, which is received by the microphone 170. The vision-assist device 100 next asks the user 300 for his height through the audio device 150. The user 300 speaks his height, which is received by the microphone 170. The user's information may be stored in a profile associated with the user 300 such that the user's information may be quickly retrieved for use by the vision-assist device 100. In some embodiments, the profile associated with the user 300 may further include other settings and user preferences.

Based on the height and weight of the user 300, the vision-assist device 100 determines that the alignment of the image sensor 160 should be adjusted in a downward direction by 10° and to the left by 15°. Then, the vision-assist device 100 adjusts the alignment of the image sensor 160 automatically.

In various embodiments, automatic adjustment of the alignment of the image sensor 160 may be performed through the use of a motor communicatively coupled to the image sensor 160. As an example and not a limitation, a servomotor may be coupled to the image sensor 160. The processor 130 may provide a signal to the motor regarding a desired alignment for the image sensor 160. The processor 130 may provide the signal to the motor directly or indirectly, such as through a dedicated controller. In response to receiving instructions from the processor, the servomotor may drive, or mechanically adjust, the alignment of the image sensor 160.

In embodiments, the vision-assist device 100 may determine at least one additional physical characteristic of the user based at least in part on received image data. For example, the processor 130 may determine a physical characteristic, such as an angle of the user's chest with respect to a horizontal axis, an angle of the user's shoulders with respect to a horizontal axis, or an amount of curvature of the user's chest, based on the image data received from the image sensor 160. For example, the processor 130 may determine an amount of skew for an object recognized in the image data received from the image sensor 160, such as an intersection between a wall and a ceiling in the environment, relative to a horizontal axis, and, based on the amount of skew, calculate an angle of the user's shoulders with respect to the horizontal axis, and thus to one another. In another example, the vision-assist device 100 may instruct the user 300 to stand in front of a feature with known dimensions and characteristics, such as a checkerboard positioned on a wall. The processor may then compare received image data to expected image data and determine a physical characteristic for the user, such as an amount of curvature of the user's chest or one or more angles of the user's body, based on the variance of the received image data from the expected image data. Such calibration processes are described in more detail in U.S. patent application Ser. No. 15/205,974, entitled "Vision-Assist Devices and Methods of Calibrating Vision-Assist Devices" and having attorney docket number 2015-402/22562-1783, which is hereby incorporated by reference in its entirety. The one or more additional physical characteristics may be further used to determine an alignment adjustment for the image sensor 160.

In various embodiments, the vision-assist device 100 may determine a correction factor for the alignment of the image sensor 160 based on a user characteristic profile for the user 300. In embodiments, based on the physical characteristics of the user, the vision-assist device 100 may select a user characteristic profile from a plurality of user characteristic profiles. Each of the user characteristic profiles may be associated with an alignment and/or a correction factor for the image sensor 160.

Figure 7:
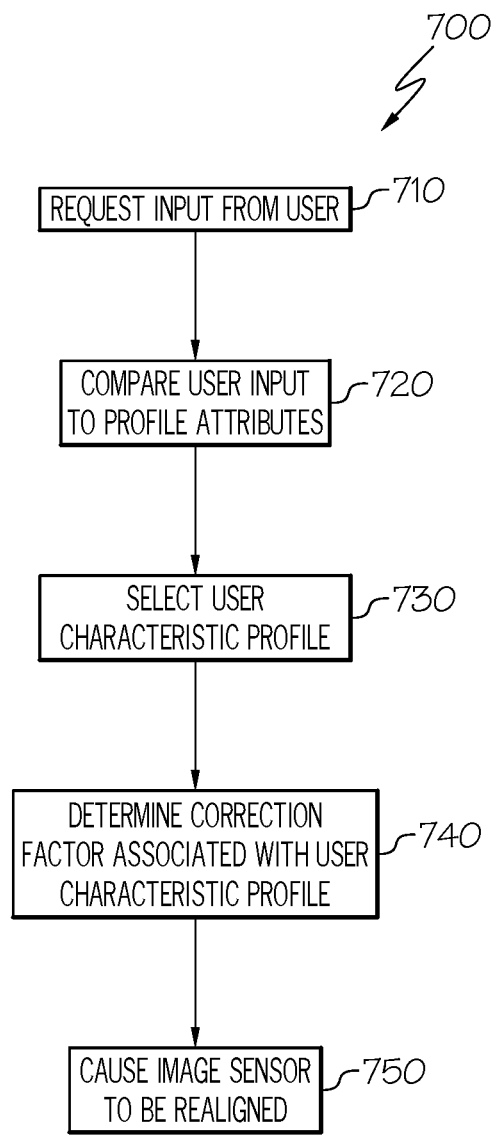
FIG. 7 graphically depicts a flowchart of aligning an image sensor based on user characteristic profile according to one or more embodiments shown and described herein.

FIG. 7 illustrates a process 700 of aligning an image sensor based on user characteristic profile. At block 710, the vision-assist device 100 may request input from the user 300 regarding the user's height, weight, and chest size. Next, at block 720, the vision-assist device 100 may compare the user's height, weight, and chest size to attributes associated with each of a plurality of user characteristic profiles. A first user characteristic profile may correspond to a person of average height, average weight, and average chest size; a second user characteristic profile may correspond to a person of above-average height, average weight, and average chest size; a third user characteristic profile may correspond to a person of average height, above-average weight, and average chest size; and so on. The vision-assist device 100 then selects the user characteristic profile that corresponds to the user's physical characteristics at block 730. Then, the vision-assist device 100 may determine that a correction factor associated with the selected user characteristic profile for the user will be used for aligning the image sensor 160 (block 740), and cause the image sensor 160 to be realigned (block 750).

Embodiments may further include multiple (i.e., two or more) image sensors 160. As but one example, the vision-assist device 100 depicted in FIGS. 2 and 3 includes two image sensors 160A, 160B. In such embodiments, each image sensor 160A, 160B may be separately and independently controlled based on one or more physical characteristics of the user. Each image sensor 160A, 160B may provide image data to the vision-assist device 100, which can determine a correction factor for each image sensor 160A, 160B. For example, the user 300 may wear the vision-assist device 100 around his neck and the curvature of the chest of the user may cause the image sensor 160A to capture image data to the user's right instead of straight ahead of the user, while the curvature of the chest of the user causes the image sensor 160B to capture image data to the user's left instead of straight ahead of the user. Accordingly, the vision-assist device 100 may adjust the alignment of the image sensor 160A to the left while the alignment of the image sensor 160B is adjusted to the right.

In embodiments, adjustment of the alignment of the image sensor may be an iterative process. For example, the vision-assist device 100 may receive image data from the image sensor 160, request user input regarding one or more physical characteristics of the user, determine an adjustment for the alignment of the image sensor 160, adjust the alignment of the image sensor 160, receive updated image date from the image sensor 160, and determine whether the alignment of the image sensor 160 should be further adjusted.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vision-assist device comprising:
   at least one image sensor for generating image data corresponding to an environment;
   a user input device for receiving user input regarding one or more physical characteristics of a user; and
   a processor, wherein the processor is programmed to:
      receive the image data from the at least one image sensor;
      receive the user input from the user input device; and
      adjust an alignment of the at least one image sensor based on the received image data and the user input,
   wherein the vision-assist device is configured to be worn by the user.

2. The vision-assist device of claim 1, wherein the one or more physical characteristics of the user are selected from a group consisting of a height of the user, a weight of the user, a neck size of the user, and a chest size of the user.

3. The vision-assist device of claim 1, further comprising a motor coupled to the at least one image sensor, wherein the processor is programmed to drive the motor to adjust the alignment of the at least one image sensor.

4. The vision-assist device of claim 1, wherein the processor is further programmed to:
   determine at least one additional physical characteristic of the user based at least in part on the received image data.

5. The vision-assist device of claim 4, wherein the at least one additional physical characteristic is selected from the group consisting of an angle of the user's chest with respect to a vertical axis, an angle of the user's shoulders with respect to a horizontal axis, and an amount of curvature of the user's chest.

6. The vision-assist device of claim 1, wherein adjusting the alignment of the at least one image sensor comprises adjusting a horizontal alignment of a field of view of the at least one image sensor.

7. The vision-assist device of claim 1, wherein adjusting the alignment of the at least one image sensor comprises adjusting a vertical alignment of a field of view of the at least one image sensor.

8. A vision-assist device comprising:
   at least one image sensor for generating image data corresponding to an environment;
   a motor coupled to the at least one image sensor;
   a user input device for receiving user input regarding one or more physical characteristics of a user; and
   a processor, wherein the processor is programmed to:
      receive the image data from the at least one image sensor;

receive the user input from the user input device; and
provide a signal to the motor regarding a desired alignment for the at least one image sensor based on the received image data and the user input,
wherein the vision-assist device is configured to be worn around a neck of the user.

9. The vision-assist device of claim 8, wherein the motor comprises a servomotor.

10. The vision-assist device of claim 8, further comprising an audio device configured to request a user input regarding the one or more physical characteristics of the user.

11. The vision-assist device of claim 10, wherein the user input device comprises a microphone.

* * * * *